(12) United States Patent
Kusunoki

(10) Patent No.: US 9,166,855 B2
(45) Date of Patent: Oct. 20, 2015

(54) MIMO COMMUNICATION METHOD, MIMO TRANSMITTING DEVICE, AND MIMO RECEIVING DEVICE

(71) Applicant: Sony Corporation, Tokyo (JP)

(72) Inventor: Shigeo Kusunoki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/178,898

(22) Filed: Feb. 12, 2014

(65) Prior Publication Data

US 2014/0254699 A1    Sep. 11, 2014

Related U.S. Application Data

(60) Provisional application No. 61/835,119, filed on Jun. 14, 2013, provisional application No. 61/776,161, filed on Mar. 11, 2013.

(51) Int. Cl.
*H04L 27/26* (2006.01)
*H04L 5/00* (2006.01)
*H04L 27/34* (2006.01)
*H04B 1/7107* (2011.01)
*H04B 7/04* (2006.01)

(52) U.S. Cl.
CPC .......... *H04L 27/265* (2013.01); *H04B 1/71072* (2013.01); *H04B 7/0413* (2013.01); *H04L 5/0021* (2013.01); *H04L 5/0023* (2013.01); *H04L 5/0026* (2013.01); *H04L 27/2602* (2013.01); *H04L 27/2628* (2013.01); *H04L 27/34* (2013.01)

(58) Field of Classification Search
CPC ...... H04B 7/0452; H04J 13/18; H04J 13/004; H04J 13/0048; H04L 27/265; H04L 27/2628
See application file for complete search history.

(56) References Cited

U.S. PATENT DOCUMENTS

2005/0210364 A1\* 9/2005 Kim .............................. 714/781
2012/0027115 A1    2/2012 Grant

FOREIGN PATENT DOCUMENTS

EP         2 773 050 A1    9/2014
WO   WO 2007/001867 A3    1/2007

OTHER PUBLICATIONS

Frank M. Caimi, PH.D, et al., "Isolated Mode Antenna Technology", SkyCross, IMAT, Jan. 2008, 9 pages.

(Continued)

*Primary Examiner* — Curtis Odom
(74) *Attorney, Agent, or Firm* — Oblon, McClelland, Maier & Neustadt, L.L.P.

(57) ABSTRACT

A first digital signal sequence including I and Q digital signal sequences is obtained, the first digital signal sequence being obtained by multiplying each bit of an I-sequence and a Q-sequence in a digital signal sequence system by a first code among codes constituting n-th order (n is an integer) orthogonal codes. A second digital signal sequence is obtained by multiplying I and Q digital signal sequences by a first coefficient greater than 1, the I and Q digital signal sequences being obtained by multiplying each of the bits in the I-sequence and the Q-sequence in the digital signal sequence system by a first code among codes constituting 2n-th order orthogonal codes. The first digital signal sequence and the second digital signal sequence are added on a bit-by-bit basis to create one digital signal sequence, and the one digital signal sequence is transmitted from a single antenna.

23 Claims, 12 Drawing Sheets

(56) References Cited

OTHER PUBLICATIONS

João S. Pereira, et al., "New UMTS Down Link OVSF With Multiple Amplitude Coding", Departamento de Engenharia Informatica, Portugal, 4 pages.

European Search Report issued Nov. 18, 2014 in EP Application No. 14158029.0-1851/2779511, 11 pages.

Zhongding Lei, et al., V-Blast Receivers for Downlink MC-CDMA Systems, Institute for Infocomm Research (I²R), 2003, IEEE, 5 pages.

João S. Pereira, et al., "New UMTS Down Link OVSF With Multiple Amplitude Coding", Departamento de Engenharia Informatica, Portugal, 4 pages.

Michael Joham, et al., "Linear Transmit Processing in MIMO Communications Systems", IEEE Transactions on Signal Processing, vol. 53, No. 8, Aug. 2005, 13 pages.

Bertrand Hochwald, et al., A Transmitter Diversity Scheme for Wideband CDMA Systems Based on Space-Time Spreading, IEEE Journal on Selected Areas in Communications, vol. 19, No. 1, Jan. 2001, 13 pages.

* cited by examiner

FIG. 12
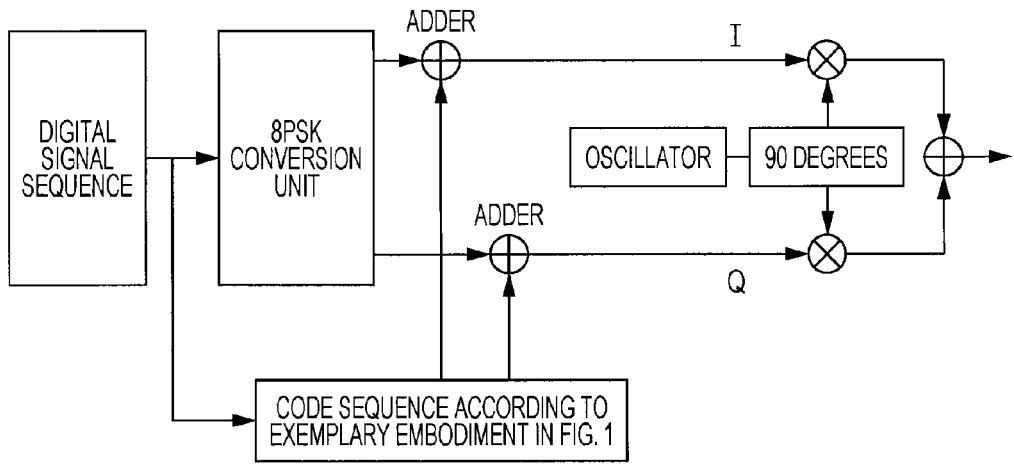
FIG. 13
DIGITAL SIGNAL SEQUENCE  0 0 0 0 1 1 1 1
                        0 0 1 1 0 0 1 1
                        0 1 0 1 0 1 0 1
                     I  1 a 0 a -1 -a 0 a
                     Q  0 a 1 a 0 -a -1 -a
         SIGNAL POINT   A B C D E F G H
WHERE $a = \frac{1}{\sqrt{2}}$
FIG. 14
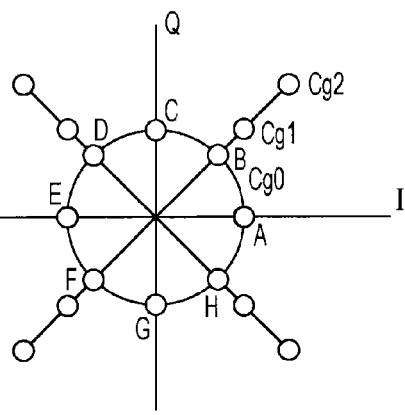

MIMO COMMUNICATION METHOD, MIMO TRANSMITTING DEVICE, AND MIMO RECEIVING DEVICE

CROSS REFERENCE TO RELATED APPLICATION

The present application claims the benefit of the earlier filing date of U.S. Provisional Patent Application Ser. No. 61/835,119 filed on Jun. 14, 2013 and 61/776,161 filed Mar. 11, 2013, the contents of each of which is incorporated herein by reference.

BACKGROUND

1. Field of the Disclosure

The present disclosure relates to a MIMO communication method that uses MIMO (multiple-input and multiple-output communication), and to a MIMO transmitting device and a MIMO receiving device.

2. Description of Related Art

A MIMO communication scheme has been put into practical use as a technology for increasing communication capacity. This technology is designed to allow different data sequences on N systems to be transmitted using a transmitter having N transmitting units and a receiver having N receiving units, where N is an integer greater than or equal to 2, and reserves a communication capacity that is N times, resulting in a communication speed that is N times, that in the case of transmission on only one system.

This technology is currently used in LTE (Long Term Evolution), WiFi (Wireless Fidelity), and the like as SU-MIMO (Single User-MIMO). In the future, an extended version will be available as MU-MIMO (Multi User MIMO), and studies on improved frequency utilization efficiency with the use of orthogonality between channels, unified operation of a plurality of cells, and so forth are being intensively made.

In MIMO, currently, as described above, a transmitter and a receiver require individually N transmitting units and N receiving units. That is, a transmitter includes N transmit antennas and N transmit circuits, and a receiver includes N receive antennas and N receive circuits. The N transmit circuits have the same characteristics and the N receive circuits have the same characteristics.

The conditions under which MIMO communication is established are the ability to separate transmit signals by measuring on the receiver side the gain of communication channels of communication paths formed between transmit and receive antennas by using a reference signal transmitted from the transmitter, representing the gain as a communication path matrix (H-matrix) in the form of a matrix, and multiplying the inverse matrix of the communication path matrix on the receiver side.

SUMMARY

In a case where a mobile terminal is a MIMO receiving device, the following problems arise.

First, a small housing needs to incorporate N (a plurality of) antennas and receive circuits. That is, the incorporation of a plurality of antennas and receive circuits is against the trend of more compact and lighter design and low power consumption of mobile terminals. In particular, 8×8 MIMO communication, which is assumed in the development of MIMO communication technology, requires up to eight antennas and eight receive circuits; however, applying such 8×8 MIMO communication to small mobile terminals is actually impossible.

Second, since diversity reception using typically two antennas for a single receiving system is common, a receiver needs to be provided with (2×N) or more antennas in order to provide diversity to the function of N×N MIMO reception. In a case where diversity is not used, the MIMO performance might not sufficiently be exploited, resulting in a problem in which a sufficient effect will not be realized if hardware such as antennas and receive circuits is incorporated.

Third, with the compactness of receivers, an increase in the correlation of communication paths between receive antennas and transmit antennas causes a problem in that the H-matrix described above is not regular and signal separation is not possible.

Accordingly, there is a demand that a technique for reducing the number of receive antennas be available for practical use. In this regard, a technology is proposed in non-patent literature "Isolated Mode Antenna Technology, January 2008", published by SkyCross Inc., U.S. This technology provides separation based on a spatial beam direction through the use of a plurality of feed points provided in a single antenna, in which an input signal from each feed point forms a different beam, and changing the planes of polarization of beams enables separation.

However, when the technique for changing the planes of polarization of beams is used for actual wireless transmission, radio waves scattered by multiple unspecified scatterers during propagation are combined and received by a receive antenna, which causes the planes of polarization to complexly rotate, resulting in a problem in that the respective systems are considerably difficult to separate.

The inventor has recognized the necessity to reduce the number of receive antennas in MIMO communication.

A MIMO communication method according to the present disclosure is a MIMO communication method having N (N is an integer greater than or equal to 2) transmit antennas.

A signal to be transmitted from a first transmit antenna is obtained by the following process.

First, a first digital signal sequence and a second digital signal sequence are obtained.

The first digital signal sequence includes I and Q digital signal sequences that are obtained by multiplying each of bits in an I-sequence and a Q-sequence in a digital signal sequence system by a first code among codes constituting n-th order (n is an integer) orthogonal codes.

The second digital signal sequence is obtained by multiplying I and Q digital signal sequences by a first coefficient greater than 1, the I and Q digital signal sequences being obtained by multiplying each of the bits in the I-sequence and the Q-sequence in the digital signal sequence system by a first code among codes constituting 2n-th order orthogonal codes.

The first digital signal sequence and the second digital signal sequence are added on a bit-by-bit basis to create one digital signal sequence.

The one digital signal sequence obtained in the manner described above is subjected to an inverse fast Fourier transform, and is then transmitted from the first transmit antenna.

A signal to be transmitted from a second transmit antenna is obtained by the following process.

First, a third digital signal sequence and a fourth digital signal sequence are obtained.

The third digital signal sequence includes I and Q digital signal sequences that are obtained by multiplying each of the bits in the I-sequence and the Q-sequence in the digital signal sequence system by a second code among the codes constituting the n-th order orthogonal codes.

The fourth digital signal sequence is obtained by multiplying I and Q digital signal sequences by the first coefficient greater than 1, the I and Q digital signal sequences being obtained by multiplying each of the bits in the I-sequence and the Q-sequence in the digital signal sequence system by a second code among the codes constituting the 2n-th order orthogonal codes.

The third digital signal sequence and the fourth digital signal sequence are added on a bit-by-bit basis to create one digital signal sequence.

The one digital signal sequence obtained in the manner described above is subjected to an inverse fast Fourier transform, and is then transmitted from the second transmit antenna.

On the receiver side, the following process is performed.

The signals transmitted from the first and second transmit antennas are received at a receive antenna, and a fast Fourier transform is performed to obtain a receive signal in a frequency axis as a first-stage receive signal. Then, a signal obtained by calculating an inner product of the first-stage receive signal and a highest-order code among the orthogonal codes used in transmission is multiplied by [1/(first coefficient)] to obtain a signal as a first decoded receive signal.

Further, a result obtained by multiplying the first decoded receive signal and the orthogonal code again is subtracted from the first-stage receive signal to obtain a second-stage receive signal, and an inner product of the second-stage receive signal and a second-highest-order orthogonal code used in transmission is calculated to obtain a signal as a second decoded receive signal.

A MIMO transmitting device according to the present disclosure is a MIMO transmitting device including N (N is an integer greater than or equal to 2) transmit antennas and N transmitting units.

The first transmitting unit obtains a first digital signal sequence and a second digital signal sequence.

The first digital signal sequence includes I and Q digital signal sequences that are obtained by multiplying each of bits in an I-sequence and a Q-sequence in a digital signal sequence system by a first code among codes constituting n-th order (n is an integer) orthogonal codes.

The second digital signal sequence is obtained by multiplying I and Q digital signal sequences by a first coefficient greater than 1, the I and Q digital signal sequences being obtained by multiplying each of the bits in the I-sequence and the Q-sequence in the digital signal sequence system by a first code among codes constituting 2n-th order orthogonal codes.

A process of adding the first digital signal sequence and the second digital signal sequence on a bit-by-bit basis to create one digital signal sequence, and performing an inverse fast Fourier transform on the one digital signal sequence to create an OFDM modulated transmit signal is performed.

A first transmit antenna transmits the OFDM modulated transmit signal created by the first transmitting unit.

A second transmitting unit obtains a third digital signal sequence and a fourth digital signal sequence.

The third digital signal sequence includes I and Q digital signal sequences that are obtained by multiplying each of the bits in the I-sequence and the Q-sequence in the digital signal sequence system by a second code among the codes constituting the n-th order orthogonal codes.

The fourth digital signal sequence is obtained by multiplying I and Q digital signal sequences by the first coefficient greater than 1, the I and Q digital signal sequences being obtained by multiplying each of the bits in the I-sequence and the Q-sequence in the digital signal sequence system by a second code among the codes constituting the 2n-th order orthogonal codes.

A process of adding the third digital signal sequence and the fourth digital signal sequence on a bit-by-bit basis to create one digital signal sequence, and performing an inverse fast Fourier transform on the one digital signal sequence to create an OFDM modulated transmit signal is performed.

A second transmit antenna transmits the OFDM modulated transmit signal created by the second transmitting unit.

A MIMO receiving device according to the present disclosure is a MIMO receiving device for receiving signals transmitted from N (N is an integer greater than or equal to 2) transmit antennas.

A signal received by a receive antenna is a signal obtained by obtaining a first digital signal sequence and a second digital signal sequence.

The first digital signal sequence includes I and Q digital signal sequences that are obtained by multiplying each of bits in an I-sequence and a Q-sequence in a digital signal sequence system by a first code among codes constituting n-th order (n is an integer) orthogonal codes.

The second digital signal sequence is obtained by multiplying I and Q digital signal sequences by a first coefficient greater than 1, the I and Q digital signal sequences being obtained by multiplying each of the bits in the I-sequence and the Q-sequence in the digital signal sequence system by a first code among codes constituting 2n-th order orthogonal codes.

The first digital signal sequence and the second digital signal sequence are added on a bit-by-bit basis to create one digital signal sequence, and the one digital signal sequence is subjected to an inverse fast Fourier transform and OFDM modulation, and is wirelessly transmitted.

Then, the MIMO receiving device performs a fast Fourier transform on the signal received by the receive antenna to obtain a receive signal in a frequency axis as a first-stage receive signal. An inner product of the first-stage receive signal and a highest-order code among the orthogonal codes used in transmission is calculated to obtain a signal, and the obtained signal is multiplied by [1/(first coefficient)] to create a first decoded receive signal.

Further, a result obtained by multiplying the first decoded receive signal and the orthogonal code again is subtracted from the first-stage receive signal to obtain a second-stage receive signal, and an inner product of the second-stage receive signal and a second-highest-order orthogonal code used in transmission is calculated to obtain a signal as a second decoded receive signal.

According to the present disclosure, applying multiplexing of codes with different amplitudes to OFDM can reduce the number of receive antennas to one, whereas conventional (N×N) MIMO requires N receive antennas. This enables high-speed MIMO communication without increasing the number of antennas.

BRIEF DESCRIPTION OF DRAWINGS

FIG. 12 is a block diagram illustrating an exemplary embodiment in which 8PSK is applied.

FIG. 13 illustrates the assignment of an 8PSK signal.

FIG. 14 illustrates signal constellation.

DETAILED DESCRIPTION

Figure 6:
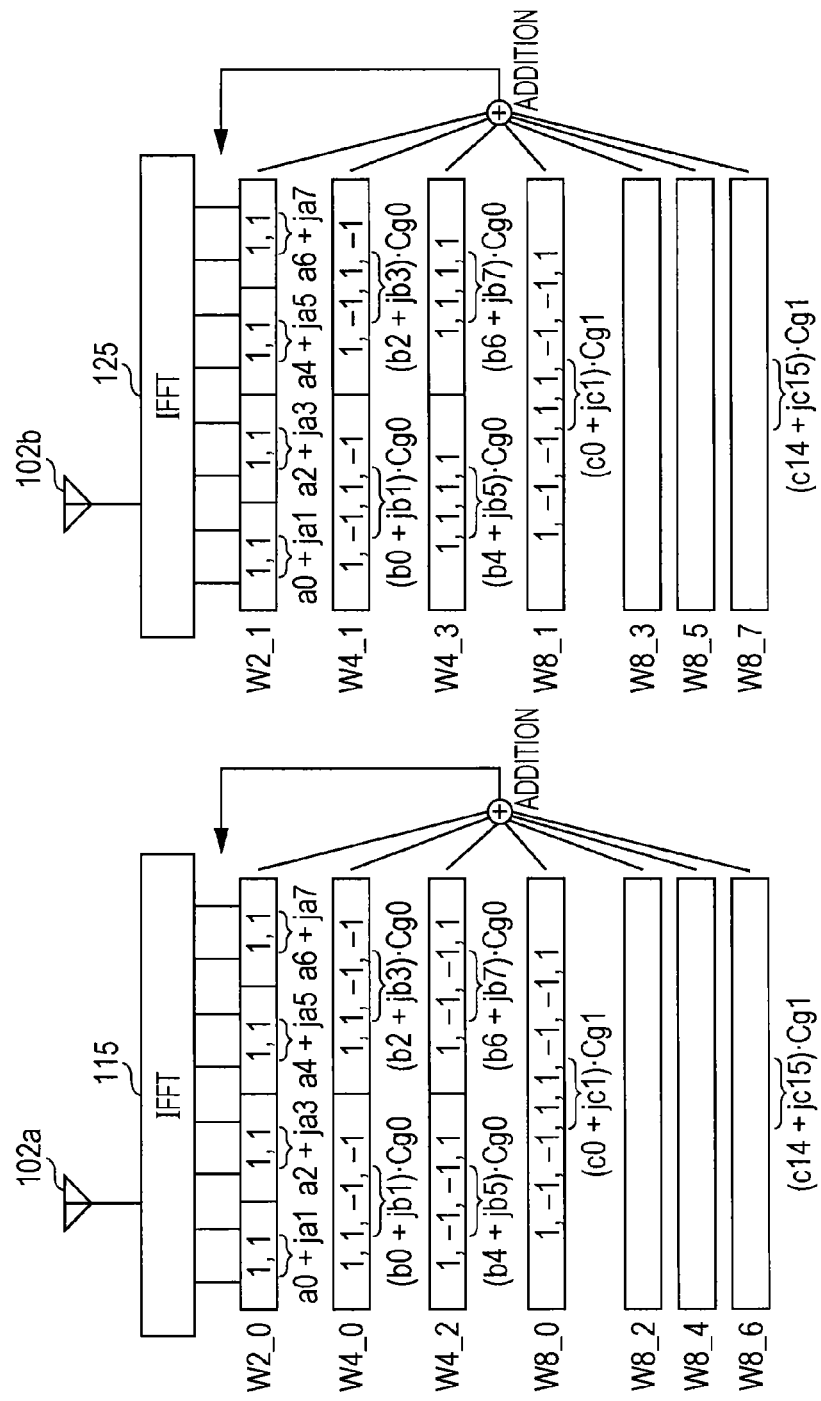
FIG. 6 is a diagram illustrating code multiplexing according to an example of another embodiment of the present disclosure.
Figure 7:
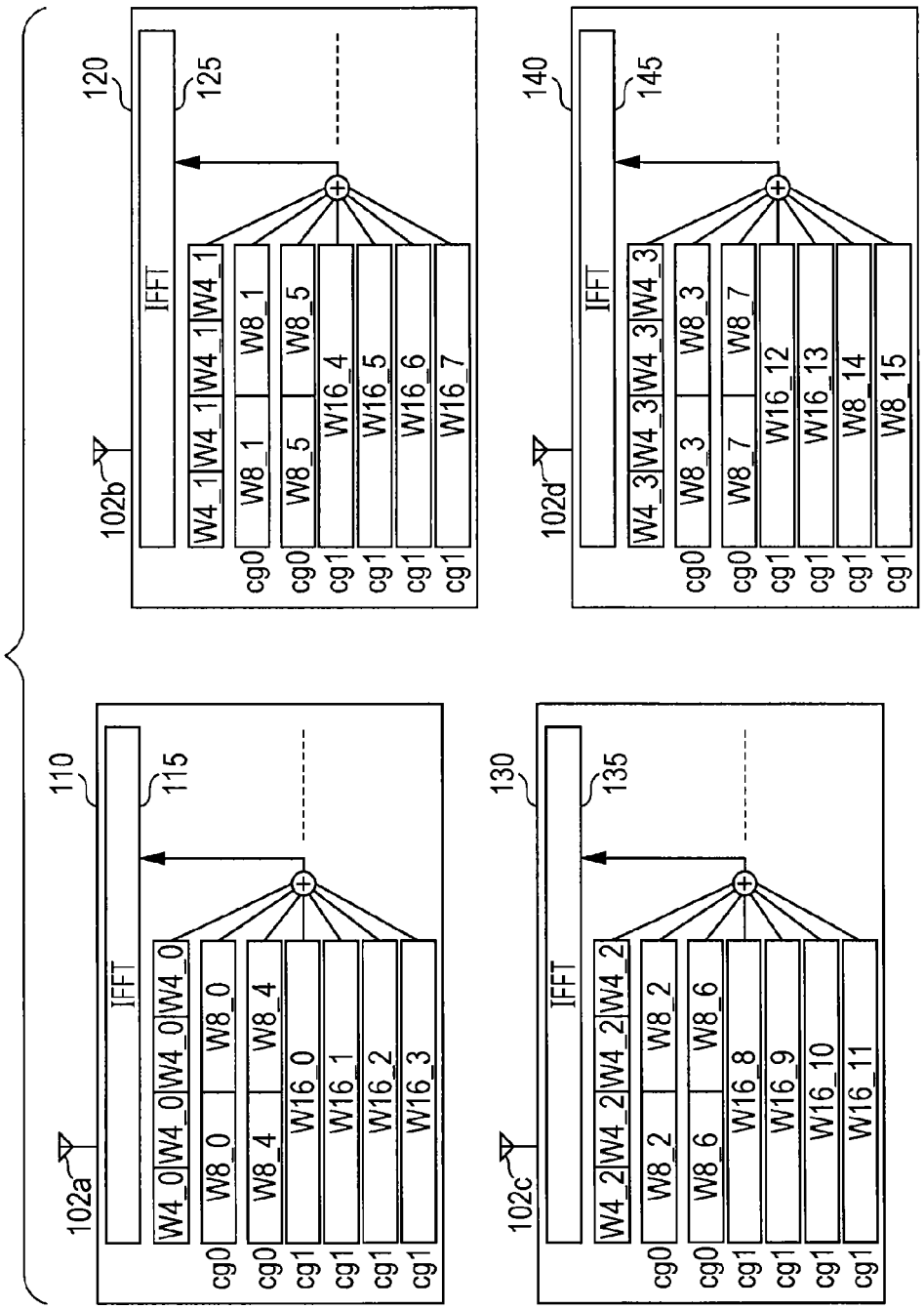
FIG. 7 is a diagram illustrating a transmitting device (an example of using four transmit antennas) according to the example of the other embodiment of the present disclosure.
Figure 8:
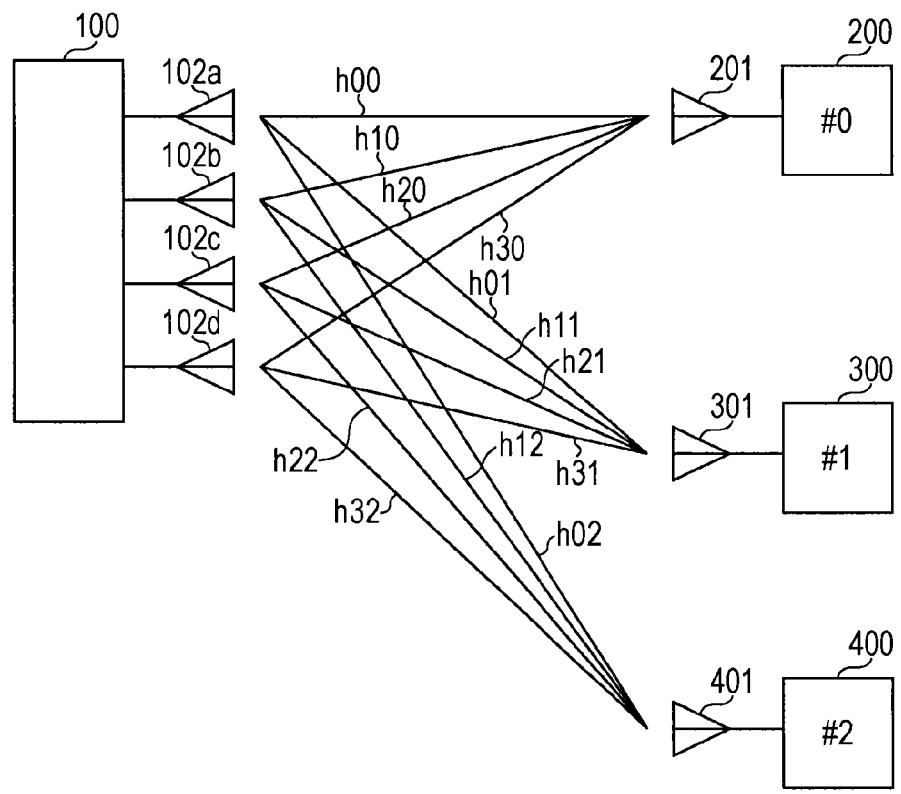
FIG. 8 is a diagram illustrating a receiving device (an example of using a plurality of terminals) according to the example of the other embodiment of the present disclosure.
Figure 9:
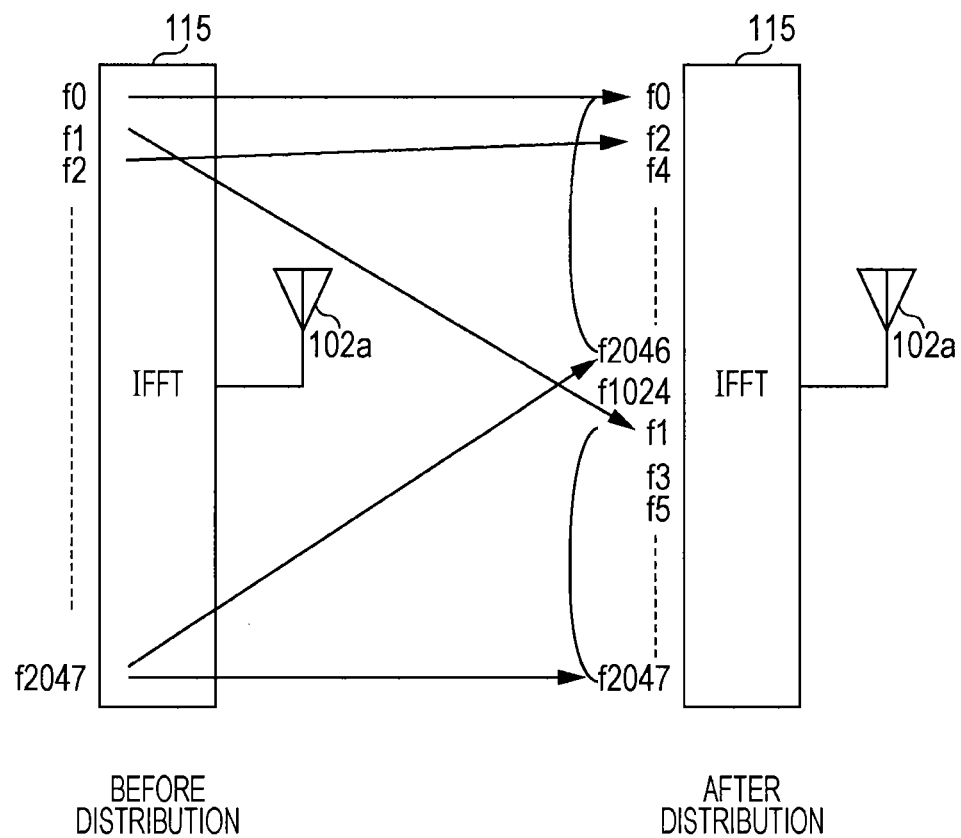
FIG. 9 is a diagram illustrating transmission according to the example of the embodiment of the present disclosure (an example of taking measures against multipath fading).

Examples of embodiments of the present disclosure will be described hereinafter with reference to the accompanying drawings in order below.
1. Example of configuration of transmitting device according to embodiment (FIG. 1)
2. Example of configuration of receiving device according to embodiment (FIG. 2)
3. Example of data multiplexing unit of transmitting device (FIG. 3)
4. Example of data arrangement (FIG. 4)
5. Example of data separation unit of receiving device (FIG. 5)
6. Example of other embodiment (other example of code multiplexing: FIG. 6)
7. Example of other embodiment (example of using four transmit antennas: FIG. 7)
8. Example of other embodiment (example of using plurality of terminals: FIG. 8)
9. Example of other embodiment (example of taking measures against multipath fading: FIG. 9)
10. Other modified examples

1. Example of Configuration of Transmitting Device according to Embodiment

Figure 1:
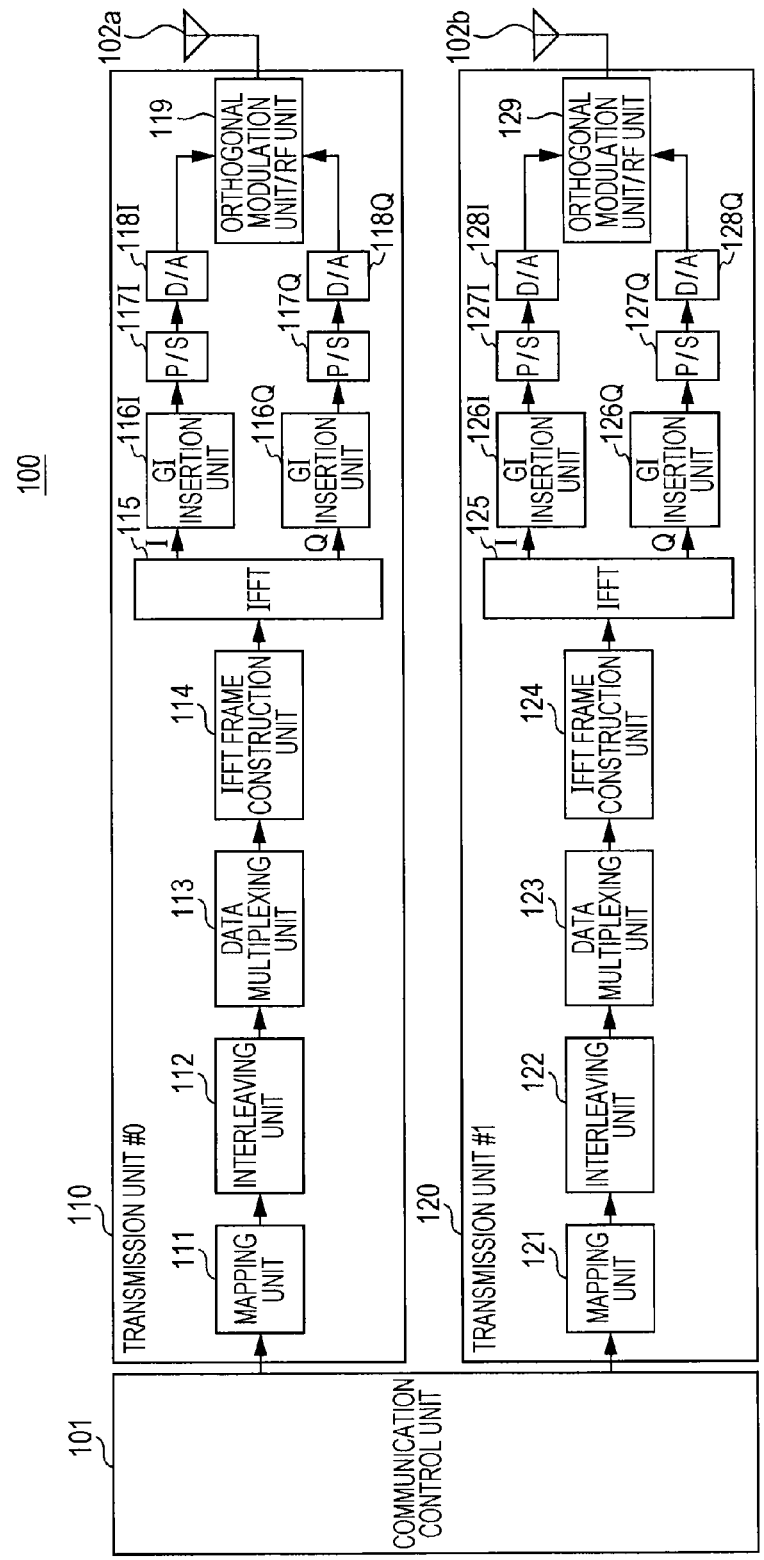
FIG. 1 is a block diagram illustrating an example of a transmitting device according to an example of an embodiment of the present disclosure.

FIG. 1 is a block diagram illustrating an example configuration of a transmitting device according to an embodiment. A transmitting device 100 illustrated in FIG. 1 is, for example, a transmitting device included in a base station used for a radiotelephone system.

In an example of the embodiment of the present disclosure, MIMO communication is performed, in which a plurality of antennas are required respectively on the transmitter side and the receiver side. Here, in the example of the present disclosure, the number of receive antennas can be reduced.

In the example in FIG. 1, an example in which a single receive antenna is used in 2×2 MIMO is illustrated. QPSK (Quadrature Phase Shift Keying)-OFDM (Orthogonal Frequency Division Multiplex) is used as a wireless transmission signal modulation scheme.

As illustrated in FIG. 1, the transmitting device 100 includes two transmitting units #0 110 and #1 120, and a communication control unit 101 controls transmission processing performed by the two transmitting units 110 and 120. The two transmitting units 110 and 120 have the same configuration.

The configuration of the transmitting unit #0 110 will be described. A data stream sent from the communication control unit 101 is supplied to a mapping unit 111. The mapping unit 111 performs mapping of the data stream. The data output from the mapping unit 111 is supplied to an interleaving unit 112. The interleaving unit 112 performs interleaving processing to distribute data in accordance with a certain rule.

The data subjected to the processing by the interleaving unit 112 is supplied to a data multiplexing unit 113, and multiplexing processing is performed. The details of the multiplexing processing will be described below. The data multiplexed by the data multiplexing unit 113 is formed in an IFFT frame construction unit 114 to create data having a frame configuration to be subjected to an inverse fast Fourier transform (IFFT).

The data having the frame configuration obtained by the IFFT frame construction unit 114 is supplied to an inverse fast Fourier transform unit 115. The inverse fast Fourier transform unit 115 performs OFDM modulation to convert from the frequency axis to the time axis, and obtains transmit data of the I-component (real-part component) and the Q-component (imaginary-part component). The transmit data of the I-component and the transmit data of the Q-component are supplied to guard interval insertion units 116I and 116Q, respectively, to insert guard intervals. The transmit data output from the guard interval insertion units 116I and 116Q are supplied to parallel/serial conversion units 117I and 117Q, and are converted into serial data. The serial data of the I-component and the Q-component obtained by the parallel/serial conversion units 117I and 117Q through conversion are supplied to digital/analog converters 118I and 118Q, and are converted into analog signals. The signals of the I-component and the Q-component obtained by the digital/analog converters 118I and 118Q through conversion are supplied to an orthogonal modulation and radio frequency unit 119, and are subjected to orthogonal modulation with the I-component and the Q-component and to frequency conversion into a certain transmit frequency. The transmit signal output from the orthogonal modulation unit and radio frequency unit 119 is supplied to a transmit antenna #0 102a, and is wirelessly transmitted from the transmit antenna 102a.

The transmitting unit #1 120 has the same configuration as the transmitting unit #0 110. That is, a data stream sent from the communication control unit 101 is supplied to a mapping unit 121, and is supplied sequentially to an interleaving unit 122, a data multiplexing unit 123, an IFFT frame construction unit 124, and an inverse fast Fourier transform unit 125 in this order for processing. Further, transmit data of the I-component and the Q-component obtained by the inverse fast Fourier transform unit 125 are supplied to guard interval insertion units 126I and 126Q, parallel/serial conversion units 127I and 127Q, digital/analog converters 128I and 128Q, and an orthogonal modulation unit and radio frequency unit 129, and are subjected to orthogonal modulation to obtain a transmit signal which has been subjected to frequency conversion into a certain transmit frequency. The transmit signal output from the orthogonal modulation unit and radio frequency unit 129 is supplied to a transmit antenna #1 102b, and is wirelessly transmitted from the transmit antenna 102b.

Note that the signals wirelessly transmitted from the two transmit antennas 102a and 102b have the same transmit frequency.

2. Example of Configuration of Receiving Device According to Embodiment

Figure 2:
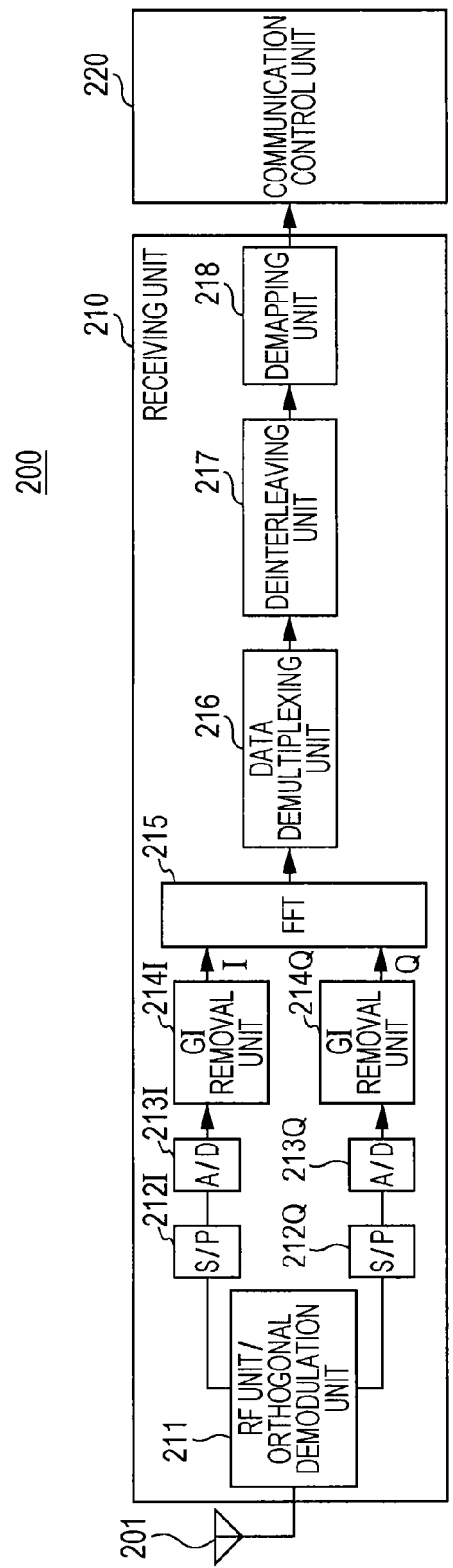
FIG. 2 is a block diagram illustrating an example of a receiving device according to the example of the embodiment of the present disclosure.

FIG. 2 is a block diagram illustrating an example configuration of a receiving device according to the embodiment. A receiving device 200 is configured as, for example, a mobile terminal used for radiotelephone.

The receiving device 200, which performs MIMO communication, includes one receive antenna 201 and one receiving unit 210.

A signal received by the receive antenna 201 is supplied to a radio frequency unit and orthogonal modulation unit 211, where a signal wirelessly transmitted from the transmitting device 100 at a certain frequency is demodulated and receive data of the I-component and the Q-component are obtained. The receive data of the I-component and the receive data of the Q-component are supplied to serial/parallel conversion units 212I and 212Q, respectively, and are converted into parallel data. The receive data of the I-component and the Q-component obtained by the serial/parallel conversion units 212I and 212Q through conversion are supplied to analog/digital converters 213I and 213Q, and are converted into digital data.

The receive data obtained by the analog/digital converters 213I and 213Q through conversion are supplied to guard interval removal units 214I and 214Q, and the guard intervals (GIs) are removed. The receive data of the I-component and the Q-component, from which the guard intervals have been removed, are supplied to a fast Fourier transform unit (FFT unit) 215, and conversion processing for converting the time axis and the frequency axis is performed for demodulation from OFDM modulation.

The data obtained by the fast Fourier transform unit 215 through transformation is supplied to a data separation unit 216, and separation processing is performed on the receive data. The separated receive data is supplied to a deinterleaving unit 217. The deinterleaving unit 217 restores data distributed by the interleaving unit in the transmission processing. The receive data restored by the deinterleaving unit 217 is supplied to a demapping unit 218, and is demapped. The receive data demapped by the demapping unit 218 is supplied to a communication control unit 220.

3. Example of Data Multiplexing Unit of Transmitting Device

Figure 3:
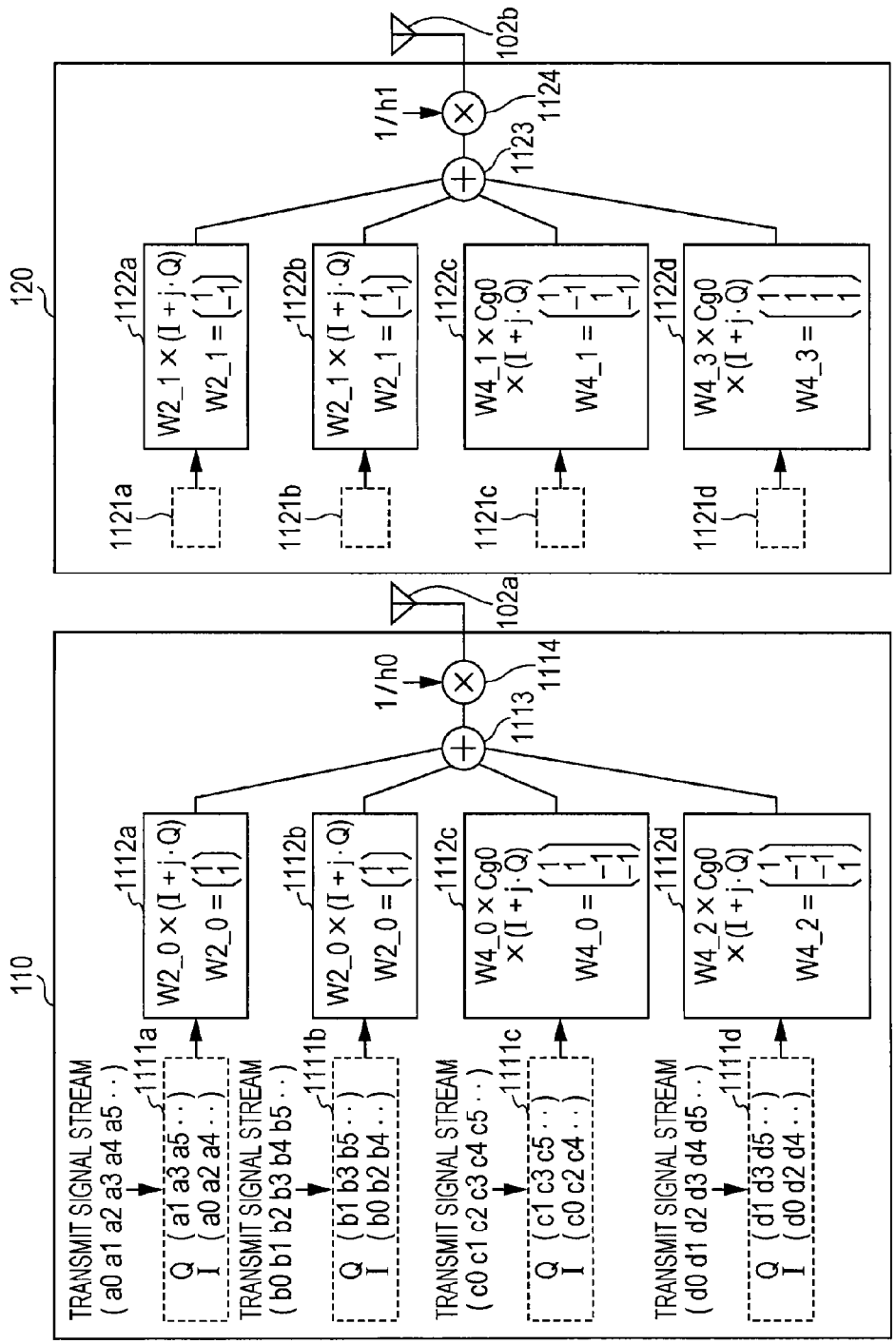
FIG. 3 is a diagram illustrating a data multiplexing unit according to the example of the embodiment of the present disclosure.

FIG. 3 illustrates an example of processing performed by the data multiplexing units 113 and 123 according to the embodiment of the present disclosure. In the transmitting unit #0 110, a transmit data stream of digital data set to the frequency axis, which is input data of the inverse fast Fourier transform unit 115, is obtained as transmit data streams 1111a, 1111b, 1111c, and 1111d that are alternately distributed into the I-component and the Q-component. Each of the streams on the I-component side and the Q-component side of the transmit data streams 1111a, 1111b, 1111c, and 1111d is multiplied by matrices W2_0 and W4_0 or W4_2 to obtain transmit data streams 1112a, 1112b, 1112c, and 1112d. After the transmit data streams 1112a, 1112b, 1112c, and 1112d are added by an adder 1113, the result is multiplied by a coefficient 1/h0 by a multiplier 1114. The coefficient 1/h0 is acquired through the feedback of a channel h0 estimated on the receiver side. The signal obtained by multiplication of the coefficient 1/h0 is wirelessly transmitted from the transmit antenna #0 102a.

Similarly, in the transmitting unit #1 120, a transmit data stream of digital data set to the frequency axis, which is input data of the inverse fast Fourier transform unit 125, is obtained as transmit data streams 1121a, 1121b, 1121c, and 1121d that are alternately distributed into the I-component and the Q-component. Each of the streams on the I-component side and the Q-component side of the transmit data streams 1121a, 1121b, 1121c, and 1121d is multiplied by matrices W2_1 and W4_1 or W4_3 to obtain transmit data streams 1122a, 1122b, 1122c, and 1122d. After the transmit data streams 1122a, 1122b, 1122c, and 1122d are added by an adder 1123, the result is multiplied by a coefficient 1/h1 by a multiplier 1124. The coefficient 1/h1 is acquired through the feedback of a channel h1 estimated on the receiver side. The signal obtained by multiplication of the coefficient 1/h1 is wirelessly transmitted from the transmit antenna #1 102b.

In FIG. 3, the configuration of the elements from the IFFT frame construction units 114 and 124 to the orthogonal modulation unit and radio frequency units 119 and 129 illustrated in FIG. 1 is omitted.

In the transmit data streams 1112a and 1112b in FIG. 3, each stream is represented by Expressions (1) and (2)

$$I=(a0,a2,a4,,,)  \quad \text{Expression (1)}$$

$$Q=(a1,a3,a5,,,), \quad \text{Expression (2)}$$

where a0, a1, etc. represent the data such as 1 and −1. Further, code W2_0 is represented by Expression (3)

$$W2\_0=(1,1)T, \quad \text{Expression (3)}$$

where "T" represents transposing of a matrix.

The multiplications of the matrix in FIG. 3 result in the following Expression (4).

$$(a0+j \cdot a1, a0+j \cdot a1, a2+j \cdot a3, a2+j \cdot a3,,,) \quad \text{Expression (4)}$$

The results above are set to the frequency axis of the inverse fast Fourier transform unit 115. Here, j denotes the imaginary unit.

The same applies to the path on the transmit antenna #1 102b side, except the matrix W2_1 to be multiplied. The matrix given by Expression (5) is used.

$$W2\_1=(1,-1)T \quad \text{Expression (5)}$$

Thus, the multiplications result in Expression (6).

$$(b0+j \cdot b1, -b0-j \cdot b1, b2+j \cdot b3, -b2-j \cdot b3,,,) \quad \text{Expression (6)}$$

Note that W2_0 and W2_1 are codes constituting second-order Walsh codes, which are orthogonal codes. Orthogonal codes other than the Walsh code may be used here.

Further, in the transmit data streams 1112c and 1112d in FIG. 3, multiplexing of fourth-order Walsh codes is performed. The code W4_0=(1, 1, −1, −1) and the code W4_2=(1, −1, −1, 1) are assigned to the transmit antenna #0 102a side. In addition, the code W4_1=(1, −1, 1, −1) and the code W4_2=(1, 1, 1, 1) are assigned to the transmit antenna #1 102b. With the processing described above, each data bit in a transmit stream is spread by a Walsh code. In the following description, the unit of bits of a Walsh code is hereinafter referred to as chips.

Further, as illustrated in FIG. 3, for multiplication of the fourth-order Walsh codes, a coefficient Cg0 for increasing the signal amplitude is also multiplied. For example, Cg0=1.1 to 1.5 is used as the value of the coefficient Cg0. The value of the coefficient Cg0 may be any other value that is greater than 1.

Further, the coefficients 1/h0 and 1/h1 based on the channels h0 and h1 are multiplied by the transmit streams by the multipliers 1114 and 1124. The purpose of multiplying the coefficients described above is to, as described below, facilitate the processes on the receiver side. The signals obtained in the manner described above are added on a chip-by-chip basis to produce one transmit stream, which is transmitted.

4. Example of Data Arrangement

Figure 4:
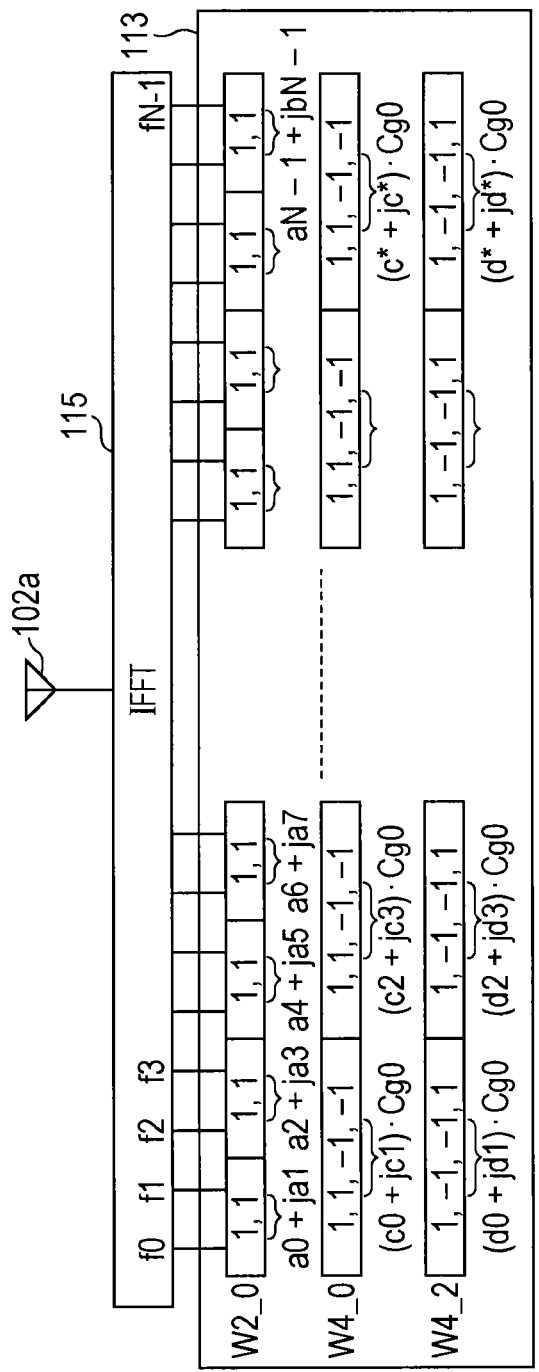
FIG. 4 is a diagram illustrating data arrangement according to the example of the embodiment of the present disclosure.

FIG. 4 illustrates data arrangement per antenna in the inverse fast Fourier transform unit 115 of the transmitting unit 110, which is obtained by the processing illustrated in FIG. 3. The data is obtained by, for example, the IFFT frame construction unit 114, is supplied to the inverse fast Fourier transform unit 115.

As illustrated in FIG. 4, two sets of two chips of a second-order Walsh code and one set of four chips of a fourth-order Walsh code are assigned to four sub-carriers. Thereby, four sub-carriers are used as the unit of assignment of a series of data, where 8 data bits (1 bit for each of I and Q) are assigned to one time slot. The assignment described above is repeated for all the frequency axes (N sub-carriers) on which an inverse fast Fourier transform is performed.

In the case of the example in this embodiment, it is possible to assign 4 bits for the second-order Walsh code and 4 bits for the fourth-order Walsh code, i.e., a total of 8 bits, to four sub-carriers. Since in the case of a conventional technique in which the processes in the example of this embodiment are not used, 8 bits (1 bit for each of I and Q) are assigned in QPSK modulation, transmission capacity in 2×2 MIMO is not impaired.

5. Example of Data Separation Unit of Receiving Device

Figure 5:
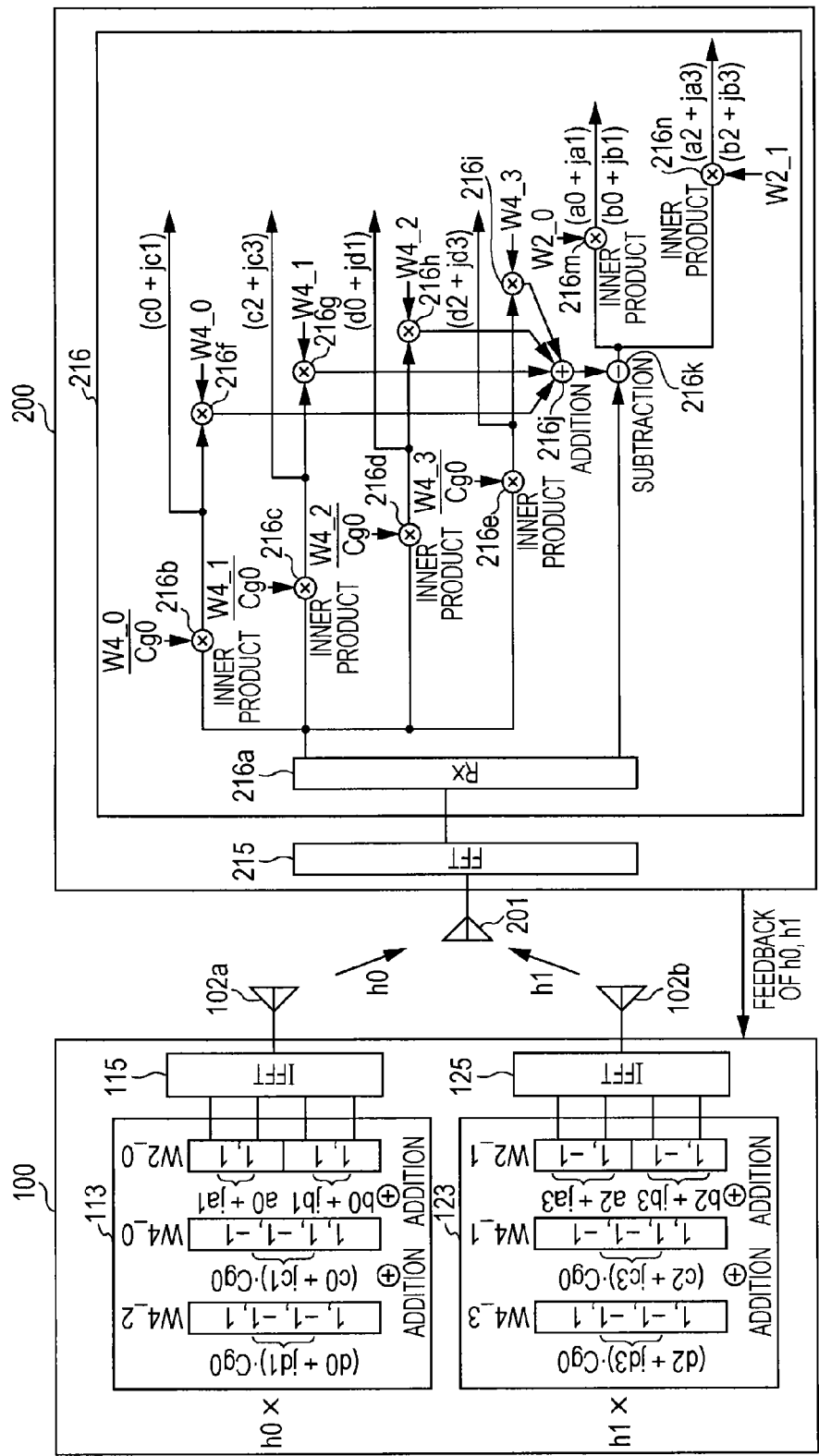
FIG. 5 is a diagram illustrating a data separation unit according to the example of the embodiment of the present disclosure.

FIG. 5 illustrates the processing operation of the data separation unit 216 of the receiving device 200. The signals on two systems transmitted from the transmitting device 100 (base station) reach a receiver while suffering from the effect of the channels h0 and h1. The receive signals in the base band can be represented as below when combined in terms of Walsh codes:

Receive signal=$\{W2\_0 \cdot (a0,a1) + W2\_0 \cdot (b0,b1) + W2\_1 \cdot (a2,a3) + W2\_1 \cdot (b2,b3)\} + \{W4\_0 \cdot (c0,c1) + W4\_2 \cdot (d0,d1) + W4\_1 \cdot (c2,c3) + W4\_3 \cdot (d2,d3)\} \cdot Cg0$,  Expression (9)

where, for convenience of simplicity, channels h0=1 and h1=1.

Note that specific receive signals at frequency numbers 0 to 3 after the transform performed by the fast Fourier transform unit 215 are obtained as given in (10) to (13) below, taking the channels h0 and h1 into account:

$\{(a0+j\cdot a1)+(c0+j\cdot c1)\cdot Cg0+(d0+j\cdot d1)\cdot Cg0\}\cdot h0+\{(a2+j\cdot a3)+(c2+j\cdot c3)\cdot Cg0+(d2+j\cdot d3)\cdot Cg0\}h1$  Expression (10)

$\{(a0+j\cdot a1)+(c0+j\cdot c1)\cdot Cg0+(-1)\cdot(d0+j\cdot d1)\cdot Cg0\}\cdot h0+\{(-1)\cdot(a2+j\cdot a3)+(c2+j\cdot c3)\cdot Cg0+(-1)\cdot(d2+j\cdot d3)\cdot Cg0\}h1$  Expression (11)

$\{(b0+j\cdot b1)+(-1)\cdot(c0+j\cdot c1)\cdot Cg0+(-1)\cdot(d0+j\cdot d1)\cdot Cg0\}\cdot h0+\{(b2+j\cdot b3)+(-1)\cdot(c2+j\cdot c3)\cdot Cg0+(-1)\cdot(d2+j\cdot d3)\cdot Cg0\}\cdot h1$  Expression (12)

$\{(b0+j\cdot b1)+(-1)\cdot(c0+j\cdot c1)\cdot Cg0+(d0+j\cdot d1)\cdot Cg0\}\cdot h0+\{(-1)\cdot(b2+j\cdot b3)+(-1)\cdot(c2+j\cdot c3)\cdot Cg0+(d2+j\cdot d3)\cdot Cg0\}\cdot h1$  Expression (13)

In order to separate the signals above, in the first step, an inner product is computed by multiplication of the higher-order Walsh code. That is, a multiplier 216b multiplies a receive data string 216a by the code W4_0, which is a fourth-order Walsh code. Further, a multiplier 216c multiplies the receive data string 216a by the code W4_1. Further, a multiplier 216d multiplies the receive data string 216a by the code W4_2. Further, a multiplier 216e multiplies the receive data string 216a by the code W4_3. During each multiplication, a coefficient Cg0 is multiplied.

Through the processes described above, the mutual inner products of the Walsh codes W4_*, which are orthogonal to each other, are zero. As a result, transmit signals (c0, c1, c2, c3, d0, d1, d2, d3) can be obtained from Expression (9). Since c0, c1, etc., are of +/−1, only the codes are determined. Due to the interference of the second-order Walsh codes, some of them might not be decoded depending on the pattern of a0, a1, etc. This can be avoided by the multiplication of the fourth-order Walsh codes by the coefficient Cg0.

This point will now be described in detail with reference to Expressions (10) to (13). For convenience of simplicity, the imaginary part of the data in Expressions (10) to (13) is 0. In the case of (a0, b0, c0, d0)=(1, −1, −1, 1), the following results of spreading are obtained.

W2_0: (1, 1, −1, −1) (Reason: 1*(1, 1), −1*(1, 1))
W4_0: (−1, −1, 1, 1) (Reason: −1*(1, 1, −1, −1))
W4_2: (1, −1, −1, 1) (Reason: 1*(1, −1, −1, 1))
Adding the results on a chip-by-chip basis yields
Σchip=(1, −1, −1, 1).
When despreading is performed at the receiver, since W4_0=(1, 1, −1, −1), the following result is obtained.
Inner product=1−1+1−1=0
That is, dispreading with the code W4_0 yields 0 although C0 (=−1) needs to be reproduced. This results from the collapse of orthogonality.

Here, multiplying the fourth-order Walsh code by cg0=1.3 yields
W2_0: (1, 1, −1, −1) (Reason: 1*(1, 1), −1*(1, 1))
W4_0: (−1.3, −1.3, 1.3, 1.3) (Reason: −1*1.3*(1, 1, −1, −1))
W4_2: (1.3, −1.3, −1.3, 1.3) (Reason: 1*1.3*(1, −1, −1, 1)).
Adding the results on a chip-by-chip basis yields
Σchip=(1, −1.6, −1.6, 1).
When despreading is performed at the receiver, since the code W4_0=(1, 1, −1, −1), the following result is obtained.
Inner product=1−1.6+1−1.6=−1.2
Reproduction is successful.

That is, in the example of this embodiment, if the coefficient Cg0=1.3=1+0.3 is employed, there may be a case where the "1" part disappears due to the interference of the second-order Walsh code. Even in this case, information on the fourth-order Walsh codes remains by using the "0.3" part, and the decoding of the signal is possible.

In the second step, multipliers 216f, 216g, 216h, and 216i again multiply the codes W4_0, W4_1, W4_2, and W4_3 using the obtained data relating to the fourth-order Walsh codes in a manner similar to that for transmission. The results are added by an adder 216j, and the added signal is subtracted from the receive signal by a subtractor 216k. As can be seen from Expression (9), this operation corresponds to an operation of subtracting the terms relating to the fourth-order Walsh codes from the receive signal, and, as a result, only the terms relating to the second-order Walsh codes remain.

In the third step, the inner products of the results obtained by the manner described above and the codes W2_0 and W2_1 are calculated by adders 216m and 216n. Therefore, all the receive streams (a0, a1, a2, a3, b0, b1, b2, b3) can be separated and decoded.

In the example in this embodiment, as illustrated in FIG. 5, the channels h0 and h1 are fed back from the receiving device 200 to the transmitting device 100, and the channels 1/h0 and 1/h1 are multiplied on the transmitter side. In the signals transmitted from the respective antennas, as a result of the channels h0 and h1 having been multiplied, h0 and h1 are canceled on the receiver side. Therefore, the h0 and h1 do not appear in the receive signals on the receiver side. This is apparent from Expressions (10) to (13). Since h0 and h1 normally have small values because of propagation information, the transmission power increases. Thus, a method in which h0/h1 is multiplied on one side of transmission, here, on the #1 side, and no processing is performed on the other side, or on the #1 side, can also be used. Since the value of h0/h1 is substantially equal to 1, the transmission power is not increased. For this purpose, a reference signal is used for this channel estimation. The reference signal depends on a conventional arrangement in OFDM. That is, transmit antennas are arranged so as not to interfere with each other in the time and frequency domains of OFDM. After h0 and h1 are estimated by the receiving device, information on the estimation is transmitted to transmitting devices. Here, the transmission of channel information from the receiving device to the transmitting devices may reduce the overall communication overhead, which may not be suitable for, for example, high-speed movement. Accordingly, the following method is also applicable.

For convenience of simplicity, Expressions (10) to (13) are written as the following Expression (14)

$$Rx = h0 \cdot (1/h0) \cdot TX0 + h1 \cdot (1/h1) \cdot Tx1 \quad \text{Expression (14)}$$
$$= TX0 + TX1,$$

where Rx denotes the receive signal, and Tx0 and Tx1 denote the transmit signals from the two transmit antennas #0 102a and #1 102b.

In addition, multiplying the transmission #1 by h0/h1 yields $$Rx = h0 \cdot TX0 + h1 \cdot (h0/h1) \cdot Tx1 \quad \text{Expression (15)}$$
$$= h0 \cdot (TX0 + TX1).$$

On the receiver side, Rx is calculated in Expression (14), and Rx/h0 is calculated in Expression (15). Then, the inner products of them and the Walsh codes described above are calculated. Therefore, data relating to the codes W4_* can be obtained. Further, data relating to the codes W2_* can be obtained by subtracting the results of multiplying the data relating to the codes W4_* by the codes W4_* from each of Rx/h0 and Rx/h1. After that, the inner products with the codes W2_* are calculated, and therefore the decoding of the data can be carried out.

This method can reduce overhead without requiring the transmission of channel information from the receiving device to the transmitting devices.

6. Example of Other Embodiment

Other Example of Code Multiplexing

FIG. 6 illustrates an example of a larger amount of transmit data multiplexing. In the case of OFDM, sub-carriers are modulated using QAM to enable a larger amount of data communication. In an example of this embodiment, since multiplication results of a plurality of orthogonal codes are added, information has already been carried in the amplitude direction. Hence, further data is multiplexed using a code multiplexing method.

FIG. 6 illustrates code multiplexing in a case where two transmit antennas are used. In FIG. 6, second-order Walsh codes are used for the first multiplexing in a manner similar to that in the example in FIG. 3. The codes W2_0 and w2_1 are assigned to the respective transmit antennas to identify the antennas from each other. The fourth-order Walsh codes are used for the second multiplexing, the set of codes W4_0 and W4_2 and the set of codes W4_1 and W4_3 are used for the separation of the antennas. This is the same as that in the example in FIG. 3.

Additionally, eighth-order Walsh codes are used for the third multiplexing. The codes W8_0, w8_2, W8_4, and W8_6 are assigned to the transmit antenna #0 102a side, and the codes w8_1, W8_3, W8_5, and W3_7 are assigned to the transmit antenna #1 102b side to identify the antennas from each other. Furthermore, a coefficient cg1 is prepared separately from the coefficient cg0, and the coefficient cg1 is multiplied when the eighth-order Walsh codes are used. The coefficients described above satisfy the relationship cg0<cg1. This enables the transmission of 24 bits per antenna, where eight sub-carriers are merged into one set.

On the receiver side, the inner product of the highest-order Walsh code and the receive signal (first-stage receive signal) is calculated, and the signal multiplied by this Walsh code is decoded from the resulting code. Then, the resulting signal is multiplied by the Walsh code, and the results are added. The sum is subtracted from the receive signal. The resulting signal is obtained as the receive signal in the second stage, and is multiplied by a high-order Walsh code. Similarly, the signal multiplied by the Walsh code is decoded. Then, the Walsh code is again multiplied, and the receive signal in the third step is obtained through addition and subtraction from the receive signal obtained in the second stage. The processes described above are repeated in a similar manner to decode all the signals.

Subsequently, increasing the number of multiplexing operations in a similar manner allows the transmission of 64 bits per antenna in a case where 16 sub-carriers are merged into one set and the sixteenth-order Walsh codes are used.

In addition, the transmission of 160 bits per antenna is possible in a case where 32 sub-carriers are merged into one set and the thirty-second-order Walsh codes are used, and the transmission of 384 bits is possible in a case where the sixty-fourth-order Walsh codes are used with 64 sub-carriers.

Comparing the above-described case with conventional wireless transmission based on OFDM, the 16QAM modulation scheme allows 64-bit transmission for 16 sub-carriers because of 4 bits per sub-carrier. The 64QAM modulation scheme allows 256-bit transmission.

Accordingly, it is found that multiplexing according to this embodiment enables data communication with equivalent capacity to MIMO communication with a plurality of receive antennas, even if a single receive antenna is used, without impairing the communication speed in conventional OFDM.

Figure 10:
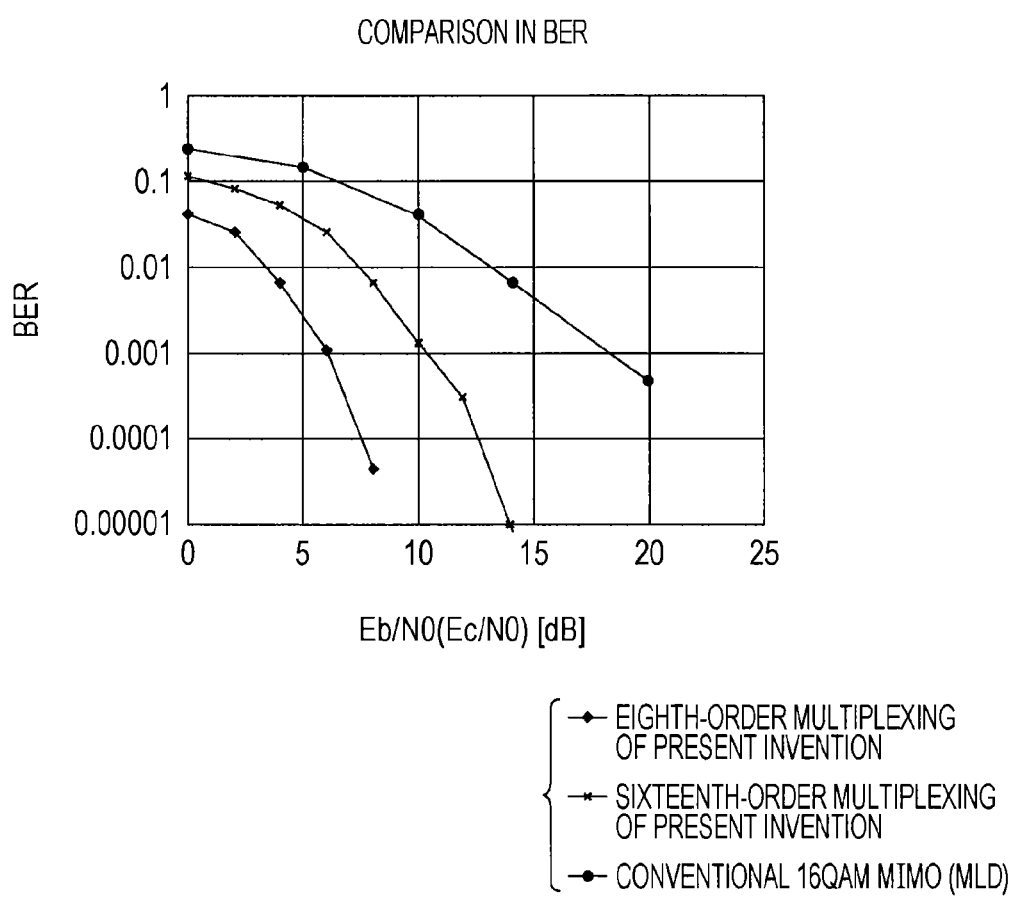
FIG. 10 illustrates Bit Error Rate (abbreviated as BER) characteristics according to the present disclosure.

FIG. 10 illustrates Bit Error Rate (abbreviated as BER) characteristics as an example of the characteristics according to the present disclosure. FIG. 10 illustrates comparison with an example of conventional 2×2 MIMO (16QAM OFDM, MLD demodulation). The present disclosure provides eighth-order multiplexing and sixteenth-order multiplexing. In eighth-order multiplexing, three orthogonal codes having lengths of 2, 4, and 8 are used, and accordingly three coefficients Cg0, Cg1, and Cg2 are required as the coefficients Cg described above. In FIG. 1, the following settings are made: Cg0=0.3, Cg1=0.5, and Cg3=1.0. In an example of sixteenth-order multiplexing, likewise, four coefficients are used, and thus the following settings are made: Cg0=0.15, Cg1=0.25, Cg2=0.5, and Cg3=1.0. In FIG. 10, the horizontal axis represents EbN0 (energy per bit); in the present disclosure, the units of chip are Eb, or Ec-equivalent. In FIG. 10, furthermore, BER is obtained without error correction such as that based on the Viterbi algorithm. In the example of conventional 16QAM MIMO, Maximum Likelihood Detection (MLD), which is the most excellent in demodulation characteristics, is used.

In FIG. 10, comparing values of EbN0 at BER=10×10$^{-3}$, equivalent BER performance is satisfied with an EbN0 which is worse than the conventional method by approximately 8 dB for sixteenth-order multiplexing of the present disclosure and 11 dB for eighth-order multiplexing. This implies that the present disclosure can achieve communication with a higher BER in a poorer communication environment than with the conventional method. This also suggests that the transmission power from the base station can be reduced by 8 dB and 11 dB. This is greatly effective for reducing inter-cell interference, and is also effective for reducing cell energy.

In this example, the peak communication speed is 75 Mbps for the conventional method, around the 10 MHz band for LTE communication specifications, and is 56.25 Mbps for eighth-order multiplexing and 75 Mbps for sixteenth-order multiplexing in the present disclosure. The peak speed can be achieved in a communication environment, that is, in a case where the EbN0 is good. As can be seen from FIG. 10, in a case where 16QAM MIMO in the conventional method is used, EbN0>approximately 17 dB is required, and, in a worse case scenario, so-called adaptive measures for the use of QPSK or the termination of MIMO is required. In actuality, in busy cities such as Tokyo, the environment of reception from base stations generally suffers from multiple scattering and Doppler fading, that is, reception under Rayleigh distribution, and a good EbN0 of approximately 10 dB to 15 dB is expected to be obtained. That is, there is a problem in that the environment that provides the peak speed is very restrictive. In contrast, the present disclosure can address this problem. The advantages of the present disclosure are illustrated in FIG. 11.

Figure 11:
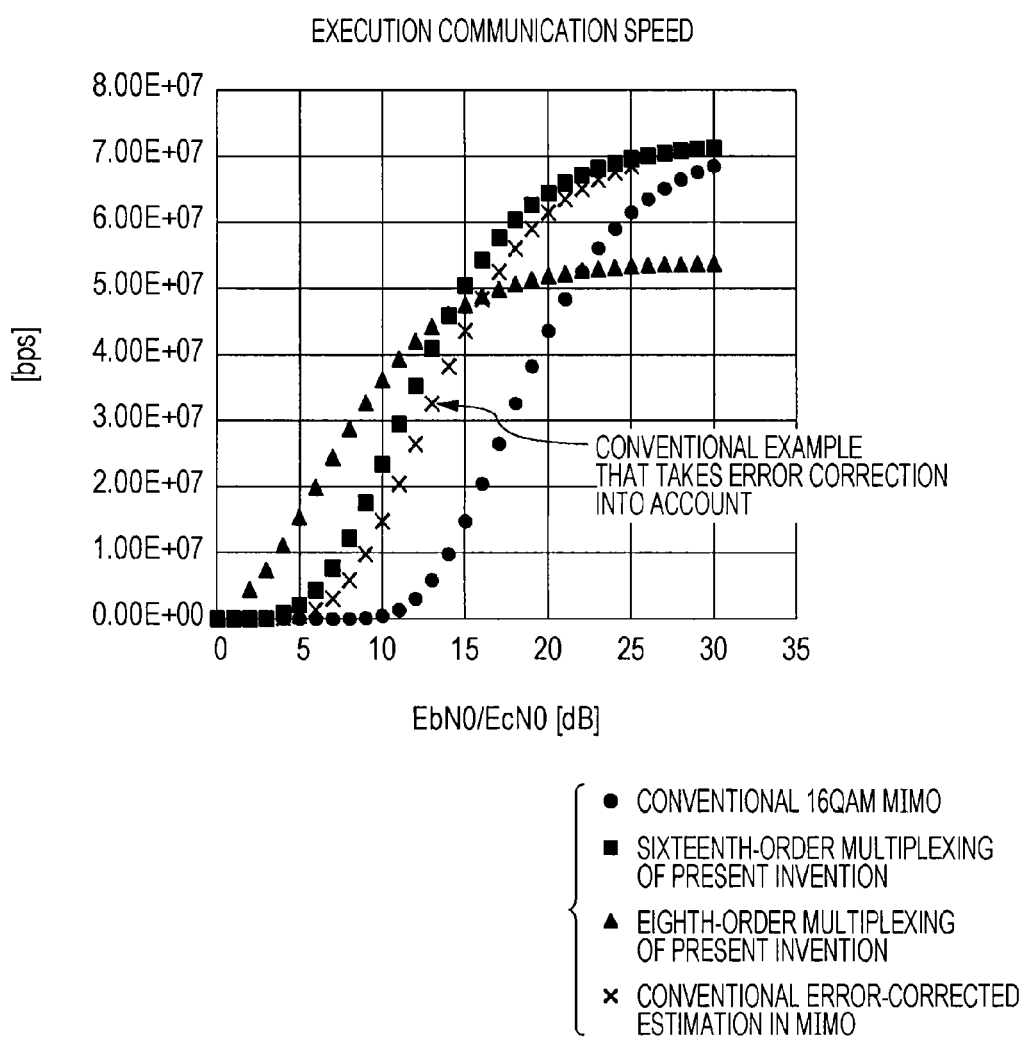
FIG. 11 is an illustration of communication speed in a Rayleigh distribution environment, which has undergone conversion using the EbN0 value at BER<$10 \times 10^{-3}$, which is obtained in FIG. 10.

FIG. 11 is an illustration of the probability that the EbN0 value at BER<10×10$^{-3}$, which is obtained in FIG. 10, occurs in a Rayleigh distribution environment, which is converted into communication speed. The horizontal axis represents the average value of the Rayleigh distribution. As can be seen from FIG. 11, the conventional method does not substantially achieve communication in the EbN0 range of 5 dB to 10 dB. In the present disclosure, in contrast, communication at 7 Mbps to 17 Mbps is possible for eighth-order multiplexing. Communication at 1 Mbps to 12 Mbps is possible for sixteenth-order multiplexing. The execution communication speed for eighth-order multiplexing is high because the desired EbN0 is low. The speed for sixteenth-order multiplexing becomes higher than that for eighth-order multiplexing around an EbN0 exceeding approximately 13 dB, and is expected to be over 70 Mbps at EbN0=approximately 25 dB. In the conventional method, however, the speed becomes 10 Mbps around EbN0=14 dB, and 70 Mbps requires EbN0=30 dB. This is not realistic.

The current LTE system solves the above problem by using error correction. Viterbi and Reed-Solomon correction provide the effect of an EbN0 improvement of approximately 5 dB at BER<10×10$^{-3}$. Applying this to FIG. 11, as illustrated in FIG. 11, an improvement from several Mbps to 12 Mbps is obtained in the EbN0 range of 5 dB to 10 dB. This substantially matches the actual field test results. Nevertheless, the execution speed is 20 Mbps or more lower than in the case where no error correction is applied to eighth-order multiplexing according to the present disclosure. The application of similar error correction to the present disclosure further increases the speed. Taking the above into account, it can be said that the execution speed according to the present disclosure can realize markedly higher speed communication in an actual environment than the conventional MIMO.

7. Example of Other Embodiment

Example of Using Four Transmit Antennas

In wireless communication disclosed herein, the number of transmit antennas may be increased. FIG. 7 illustrates a configuration in a case where four antennas are used. That is, four transmitting units 110, 120, 130, and 140 and four transmit antennas 102a, 102b, 102c, and 102d are provided.

In the example in FIG. 7, Walsh codes are assigned, where 16 sub-carriers handled by inverse fast Fourier transform units 115, 125, 135, and 145 included in the transmitting units 110 to 140 are merged into one set. The minimum order is four, and the maximum order is sixteen. The fourth-order Walsh codes (W4_0, W4_1, W4_2, W4_3) are assigned to the four transmit antennas 102a, 102b, 102c, and 102d, respectively. Since the eighth-order Walsh codes have eight types, two types of them are assigned to each of the four transmit antennas 102a, 102b, 102c, and 102d. Since the sixteenth-order Walsh codes have 16 types, four of them are assigned to each of the four transmit antennas 102a, 102b, 102c, and 102d. The codes to which the eighth-order and sixteenth-order Walsh codes are assigned are multiplied by coefficients cg0 and cg1 for increasing the amplitude, where cg0<cg1.

The signals to be assigned to sub-carriers on the input side of the inverse fast Fourier transform units 115, 125, 135, and 145 are subjected to fast Fourier transform at the reception time, and are then separated by the orthogonality of the sub-carriers. The configuration described above enables transmission in units of 24 bits per antenna, where 16 sub-carriers are merged into one set. In order to increase the communication speed, similarly, the number of multiplexing operations may be increased.

Note that the receiving device may perform diversity reception with two receive antennas. That is, diversity reception of different signals transmitted from N (N is an integer greater than or equal to 2) transmit antennas is possible using two receive antennas. Even in the case of N transmit antennas, reception with the individual receive antennas allows the separation of transmit signals from the respective transmit antennas. Accordingly, a receiving terminal incorporating two antennas is capable of serving the diversity function rather than signal separation. In the case of diversity reception, for example, maximum-ratio combining and selection diversity, which are known in the art, can be used.

Next, an example of the coefficient cgm for increasing the signal amplitude will be described. In the example in FIG. 3, the inner products of signals multiplied by the fourth-order Walsh codes and four chips are calculated on the receiver side, and decoding is performed. That is, energy corresponding to four chips for every 2 data bits (1 bit for each of I and Q) is added. This is to determine the S/N of a decoded signal. Similarly, for the eighth-order Walsh codes, addition for eight chips is performed. Accordingly, it is found that, for the cases of a high-order Walsh code, an equivalent S/N is obtained with one half the value of the coefficient cgm in the case of an immediately lower Walsh code. Although the coefficient cgm is effective to increase variations in the amplitude of a combined signal, it increases peak average ratio (PAR) and degrades the distortion performance of a transmission power amplifier. Thus, increasing the value is not appropriate. On the other hand, the purpose of multiplying the coefficient cgm is to, as already described above, prevent disturbance of orthogonality caused by the spreading of data by different-order Walsh codes. That is, as described here, if the coefficient cgm has the relationship ½ for Walsh codes whose orders are different by one, the inner product=0 is not avoidable. To satisfy the conditions described above, a value slightly larger than ½ is employed. For example, 0.6 (=½+1/10) is used.

In summary, the following result is obtained.

If the coefficient cgm is given by cgm=1+am (m is an integer, where am>0) and the largest order of all the orthogonal codes (Walsh codes) used is represented by M (M is an integer), a(M−1)=a(M)×{(½)+k}, and the relationship k>0 is satisfied.

8. Example of Other Embodiment

Example of Using Plurality of Terminals

Next, an example where a plurality of receiving devices are present will be described. This means that MU-MIMO is implemented. FIG. 8 is a diagram illustrating this example.

In FIG. 8, three terminals (receiving devices 200, 300, and 400), which are receiving devices, are connected to a single base station (transmitting device 100) via wireless communication. The base station (transmitting device 100) has four transmit antennas 102a, 102b, 102c, and 102d, and uses, for example, the transmit signal arrangement illustrated in FIG. 7. Further, the receiving devices 200, 300, and 400 serving as terminals have single receive antennas 201, 301, and 401, respectively. Each of the receiving devices 200, 300, and 400 has the same configuration as that of the receiving device 200 illustrated in FIG. 2 and FIG. 5. As illustrated in FIG. 8, channels h00, h10, h20, h30, h01, h11, h21, h31, h02, h12, h22, and h32 are disposed between the transmit antennas 102a, 102b, 102c, and 102d of the transmitting device 100 and the receive antennas 201, 301, and 401 of the receiving devices 200, 300, and 400.

In the example in FIG. 8, the receiving devices 200, 300, and 400, which are capable of operating in 4×1 MIMO, have, unlike conventional 4×1 MIMO, the capability to receive and separate different pieces of data transmitted from the four transmit antennas 102a, 102b, 102c, and 102d using a single receive antenna (one of the receive antennas 201, 301, and 401) through the processes described in this embodiment. This enables, as already described above, a larger amount of data communication than that in the case of using a single transmit antenna.

In the example in FIG. 8, furthermore, a system can be configured such that each receiving device decodes a different Walsh code. For example, the receiving device 200 decodes only the code W4_0 and the codes W16_0 and 1 transmitted from the transmit antenna 102a in FIG. 7, the receiving device 300 decodes only the code W4_1 and the codes W16_4 and 5 transmitted from the transmit antenna 102b in FIG. 7, and the receiving device 400 decodes only the codes W4_2 and W4_3 and the codes W16_8, 9, 12, and 13 transmitted from the transmit antennas 102c and 102d in FIG. 7. Thus, for example, control information, which is spread by the codes W16_*, and data, which is spread by the codes W4_*, are simultaneously transmitted, thus enabling the management of layer for communication. In the case of doing so, furthermore, the receiving device 400 requires a larger amount of data communication, and can occupy signal lines from the two transmit antennas 102c and 102d of the base station.

The example in FIG. 8 assumes so-called MU-MIMO. In normal MU-MIMO, precoding is performed in which a channel matrix is determined (in this example, a three-row by four-column matrix) and another matrix (beamforming matrix) such as that in which matrix elements of channels that do not interfere with each other are zero is multiplied by the transmitter side. In this case, the processes of feeding channel information (in FIG. 8, h**) back to the base station from the terminals and determining a beamforming matrix are required. The number of processes increases in accordance with an increase in the number of antennas and the number of terminals, causing an increase in overall overhead, resulting in a reduction in communication speed or capacity. In addition, there is a problem in that during high-speed movement, the time period required for such feedback might not keep up with the movement speed, causing a collapse of communication. The example of the embodiment of the present disclosure may be worthy of being used as means for solving the foregoing problems.

In the example of the embodiment of the present disclosure, for example, the frequencies used for all the transmission systems illustrated in FIG. 8 are set to the same value. That is, the frequencies of the radio frequency units that are used are set to be the same value. Thus, the frequency utilization efficiency can be set to be equivalent to that in normal MU-MIMO, and a reduction in frequency utilization efficiency is avoidable.

9. Example of Other Embodiment

Example of Taking Measures against Multipath Fading

Next, an exemplary embodiment for taking measures against multipath fading will be given. Under frequency selective fading environment, the output of the respective sub-carrier components which have been subjected to fast Fourier transform on the receiver side varies due to fading. In an example in this embodiment, transmit data of 1 bit is assigned to a plurality of consecutive sub-carriers using a spread code. Thus, the possibility that the transmit data can be reproduced even if part of the data is missing due to fading can be longer than that for normal OFDM by a multiple of the spread length. Here, in order to achieve a design that further increases robustness against fading, spread chips are not assigned to consecutive sub-carriers but are distributed. This method allows the same data to be assigned to different frequencies, and the effect of fading is distributed.

FIG. 9 illustrates an example of signal arrangement in the case where chips are distributed during the transform performed by the inverse fast Fourier transform unit 115 in the transmitting device 100. Before distribution on the left part, the sub-carrier components are arranged in ascending order of frequencies, whereas after distribution on the right part, even numbers and odd numbers are arranged in upper and lower parts of frequencies. On the receiver side, after a fast Fourier transform is performed, rearrangement is performed and then the data can be decoded by the same procedure as that in the example illustrated in FIG. 5.

As described above, according to examples of embodiments of the present disclosure, applying multiplexing of codes with different amplitudes to OFDM can reduce the number of receive antennas to one, whereas conventional (N×N) MIMO requires N receive antennas. Thus, beneficial effects of making high-speed MIMO communication feasible without increasing the number of antennas in a small terminal and also implementing high-reliability communication based on diversity can be realized. In addition, also in MU-MIMO including a plurality of terminals, code multiplexing can provide the effect of no need for complex channel estimation and orthogonalization, which are required conventionally.

10. Other Modified Examples

Note that the configurations and processes recited in the claims of the present disclosure are not limited to those in the examples of the embodiments described above. It is to be understood that it is obvious to a person skilled in the art that a variety of modifications, combinations, and variations of the illustrated exemplary embodiments as come within the scope of the claims or equivalents thereof are possible depending on design or other elements.

11. Other Exemplary Embodiments

Example in which 8PSK Modulation is Incorporated

An exemplary embodiment illustrated in FIGS. 12, 13, and 14 is an example in which 8-phase shift keying (abbreviated as 8PSK) modulation is applied to the data at a spreader based on second-order orthogonal codes in the first exemplary embodiment illustrated in FIG. 1 and subsequent figures. This achieves the effect of increasing the peak speed without increasing the number of multiplexing operations.

FIG. 12 is a block diagram illustrating this exemplary embodiment. FIG. 13 illustrates the assignment of an 8PSK signal. FIG. 14 illustrates signal constellation.

In FIG. 13, a portion where the I- and Q-sequences, which are composed of +/−1 digital signals, are spread by second-order orthogonal codes is assigned to an 8PSK conversion unit, and the remaining portion is assigned to the sequence according to the exemplary embodiment illustrated in FIG. 1. The 8PSK conversion unit assigns the I- and Q-signals to 8PSK signals in sets of 3 bits in accordance with the rule illustrated in FIG. 13. The results of assignment and the I- and Q-signals obtained from the code sequence according to the exemplary embodiment illustrated in FIG. 1 are added by respective adders, and the results are input to orthogonal modulators.

The signal constellation illustrated in FIG. 14 will be described. A signal to be spread by a second-order orthogonal code is placed at any of eight points A to H in an inner circle in FIG. 14 for 8PSK. The diameter of the circle is determined by the coefficient Cg0. A QPSK modulated fourth-order spread signal is placed at the outer Cg1 position, and an eighth-order spread signal is placed at the further outer Cg2 position. Hence, the amount of communication for eighth-order multiplexing can be increased to 28 bits from 24 bits (the communication speed is 52.25 Mbps on LTE) for eight sub-carriers per antenna, and the communication speed is 65.625 Mbps/5 MHz for the LTE specifications.

The invention claimed is:

1. A multiple-input and multiple-output (MIMO) communication method having N (N is an integer greater than or equal to 2) transmit antennas, the MIMO communication method comprising:

obtaining a first digital signal sequence including I and Q digital signal sequences, the first digital signal sequence being obtained by multiplying each bit of an I-sequence and a Q-sequence in a digital signal sequence system by a first code among codes constituting n-th order (n is an integer) orthogonal codes, and obtaining a second digital signal sequence by multiplying I and Q digital signal sequences by a first coefficient greater than 1, the I and Q digital signal sequences being obtained by multiplying each bit of the I-sequence and the Q-sequence in the digital signal sequence system by a first code among codes constituting 2n-th order orthogonal codes;

adding the first digital signal sequence and the second digital signal sequence on a bit-by-bit basis to create a first composite digital signal sequence;

transmitting the first composite digital signal sequence from a first transmit antenna after performing an inverse fast Fourier transform on the first composite digital signal sequence;

obtaining a third digital signal sequence including I and Q digital signal sequences, the third digital signal sequence being obtained by multiplying each bit of the I-sequence and the Q-sequence in the digital signal sequence system by a second code among the codes constituting the n-th order orthogonal codes;

obtaining a fourth digital signal sequence by multiplying I and Q digital signal sequences by the first coefficient greater than 1, the I and Q digital signal sequences being obtained by multiplying each bit of the I-sequence and the Q-sequence in the digital signal sequence system by a second code among the codes constituting the 2n-th order orthogonal codes;

adding the third digital signal sequence and the fourth digital signal sequence on a bit-by-bit basis to create a second composite digital signal sequence; and transmitting the second composite digital signal sequence from a second transmit antenna after performing an inverse fast Fourier transform on the second composite digital signal sequence.

2. The method according to claim 1, further comprising:

receiving, at a receive antenna, the signals transmitted from the first and second transmit antennas;

performing a fast Fourier transform to obtain a receive signal in a frequency axis as a first-stage receive signal;

multiplying a signal obtained by calculating an inner product of the first-stage receive signal and a highest-order code among the orthogonal codes used in transmission by [1/(first coefficient)] to obtain a signal as a first decoded receive signal;

subtracting a result obtained by multiplying the first decoded receive signal and the highest-order orthogonal code from the first-stage receive signal to obtain a second-stage receive signal; and calculating an inner product of the second-stage receive signal and a second-highest-order orthogonal code used in transmission to obtain a signal as a second decoded receive signal.

3. The method of claim 1, wherein data to be transmitted from the N transmit antennas is multiplied by channels (1/h0, 1/h1, . . . , 1/h(N−1)) to obtain a result as transmission data to be transmitted from the respective transmit antennas.

4. The method of claim 1, wherein data to be transmitted from the N transmit antennas is multiplied by channels (1, h0/h1, . . . , h0/h(N−1)) to obtain a result as transmission data to be transmitted from the respective transmit antennas.

5. The method of claim 2, further comprising:
calculating an inner product of an orthogonal code and a signal obtained by multiplying the first-stage receive signal by channels (h0 and h1, . . . , h(N−1)).

6. The method of claim 2, further comprising:
calculating an inner product of an orthogonal code and a signal obtained by multiplying the first-stage receive signal by channel (1/h0).

7. The method of claim 2, wherein
the number of receive antennas is two, and diversity reception is performed using the two antennas.

8. The method of claim 1, wherein
in a case where the first coefficient is a coefficient cgm, cgm=1+am (where am is a value >0), and in a case where a largest order of all the orthogonal codes used is represented by M (M is an integer), a(M−1)=a(M)×{(½)+k}, and a relationship where k is a value >0 is satisfied.

9. The method of claim 2, wherein
inner products are calculated using only a subset of the orthogonal codes used for transmission and only signals multiplied by the subset of the orthogonal codes are decoded.

10. The method of claim 1, wherein
the N transmit antennas perform transmission at a same frequency.

11. The method of claim 2, wherein
chips to be assigned to sub-carriers for transmission are distributed and arranged over a frequency axis on which an inverse fast Fourier transform is performed, in accordance with a predetermined rule, and
the signal obtained in the frequency axis by fast Fourier transformation during reception is decoded after the chips, which have been distributed in accordance with the predetermined rule, are restored.

12. A multiple-input and multiple-output (MIMO) transmitting device comprising:
circuitry configured to
obtain a first digital signal sequence including I and Q digital signal sequences, the first digital signal sequence being obtained by multiplying each bit of an I-sequence and a Q-sequence in a digital signal sequence system by a first code among codes constituting n-th order (n is an integer) orthogonal codes, and
obtain a second digital signal sequence by multiplying I and Q digital signal sequences by a first coefficient greater than 1, the I and Q digital signal sequences being obtained by multiplying each bit of the I-sequence and the Q-sequence in the digital signal sequence system by a first code among codes constituting 2n-th order orthogonal codes;
add the first digital signal sequence and the second digital signal sequence on a bit-by-bit basis to create a first composite digital signal sequence;
control a first antenna to transmit the first composite digital signal sequence from a first transmit antenna after performing an inverse fast Fourier transform on the first composite digital signal sequence;
obtain a third digital signal sequence including I and Q digital signal sequences, the third digital signal sequence being obtained by multiplying each bit of the I-sequence and the Q-sequence in the digital signal sequence system by a second code among the codes constituting the n-th order orthogonal codes;
obtain a fourth digital signal sequence by multiplying I and Q digital signal sequences by the first coefficient greater than 1, the I and Q digital signal sequences being obtained by multiplying each bit of the I-sequence and the Q-sequence in the digital signal sequence system by a second code among the codes constituting the 2n-th order orthogonal codes;
add the third digital signal sequence and the fourth digital signal sequence on a bit-by-bit basis to create a second composite digital signal sequence; and
control a second antenna to transmit the second composite digital signal sequence after performing an inverse fast Fourier transform on the second composite digital signal sequence.

13. The device of claim 12, wherein
the circuitry is configured to multiply data to be transmitted from the first and second antennas by channels (h0 and h1, . . . , h(N−1)) to obtain a result as transmission data to be transmitted from the first and second antennas.

14. The device of claim 12, wherein
in a case where the first coefficient is a coefficient cgm, cgm=1+am (where am is a value >0), and in a case where a largest order of all the orthogonal codes used is represented by M (M is an integer), a(M−1)=a(M)×{(½)+k}, and a relationship where k is a value >0 is satisfied.

15. The device of claim 12, wherein
the first and second antennas perform transmission at a same frequency.

16. The device of claim 12, wherein
the circuitry is configured to assign chips to sub-carriers for transmission so that the chips are distributed and arranged over a frequency axis on which an inverse fast Fourier transform is performed in accordance with a predetermined rule.

17. The device of claim 12, wherein
the circuitry is configured to subject a signal to be spread by an n-th order orthogonal code to 8PSK modulation.

18. A multiple-input and multiple-output (MIMO) receiving device for receiving comprising:
circuitry configured to
receive first and second signals transmitted from first and second transmit antennas;
perform a fast Fourier transform to obtain a receive signal in a frequency axis as a first-stage receive signal;
multiply a signal obtained by calculating an inner product of the first-stage receive signal and a highest-order code among orthogonal codes used in transmission by [1/(a first coefficient)] to obtain a signal as a first decoded receive signal;
subtract a result obtained by multiplying the first decoded receive signal and the highest-order orthogonal code from the first-stage receive signal to obtain a second-stage receive signal; and
calculate an inner product of the second-stage receive signal and a second-highest-order orthogonal code used in transmission to obtain a signal as a second decoded receive signal.

19. The device of claim 18, wherein
the circuitry is configured to calculate an inner product of an orthogonal code and a signal obtained by multiplying the first-stage receive signal by channels (h0 and h1, . . . , h(N−1)).

20. The device of claim 18, further comprising:
a first antenna; and
a second antenna, wherein
diversity reception is performed using the first and second antennas.

21. The device of claim 18, wherein
in a case where the first coefficient is a coefficient cgm, cgm=1+am (where am is a value >0), and in a case where a largest order of all the orthogonal codes used is represented by M (M is an integer), a(M−1)=a(M)×{(½)+k}, and a relationship where k is a value >0 is satisfied.

22. The device of claim 18, wherein
the circuitry is configured to calculate inner products using only a subset of orthogonal codes used for transmission; and
decode only signals multiplied by the subset of the orthogonal codes.

23. The device of claim 18, wherein
the circuitry is configured to decode the signal obtained in the frequency axis by fast Fourier transformation after items, which have been distributed during transmission in accordance with a predetermined rule, are restored.

* * * * *